Dec. 16, 1969   H. J. SHANKWITZ   3,484,670
SOFT START CAPACITOR-START MOTOR
Filed Oct. 11, 1967
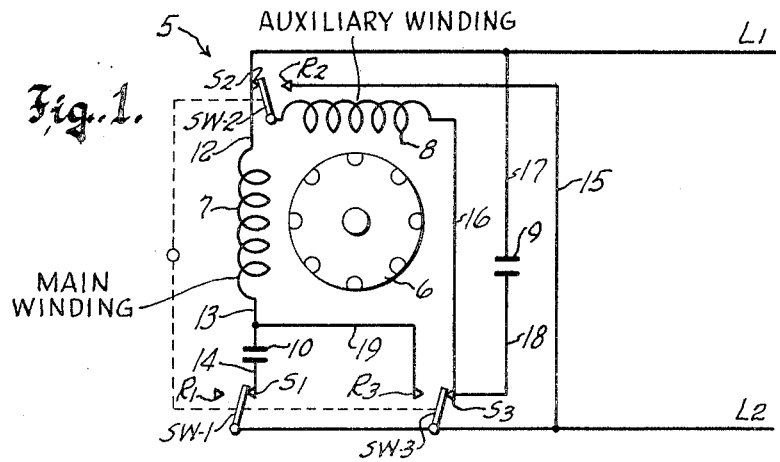
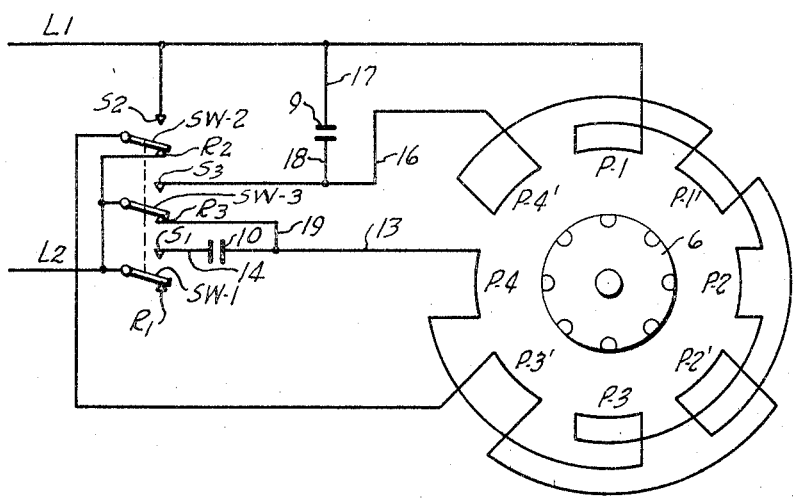
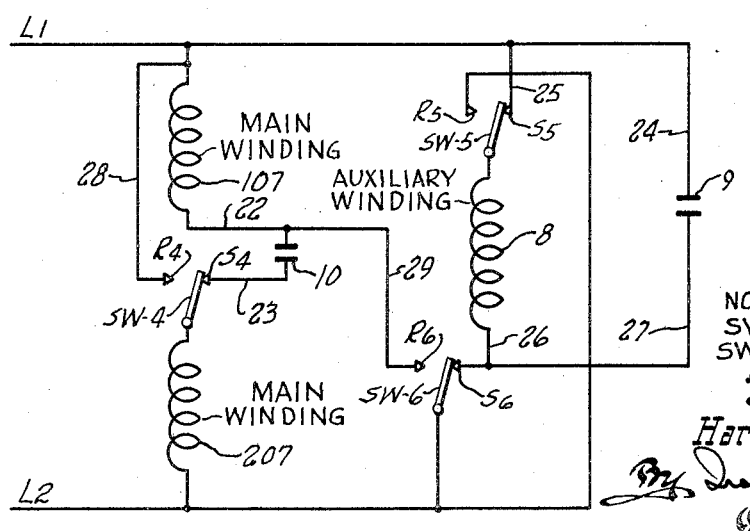
NOTE: SWITCHES SW-4, SW-5 AND SW-6 ARE GANGED
Inventor
Harold J. Shankwitz United States Patent Office 3,484,670
Patented Dec. 16, 1969

3,484,670
SOFT START CAPACITOR-START MOTOR
Harold J. Shankwitz, Wausau, Wis., assignor to Marathon Electric Manufacturing Corporation, Wausau, Wis., a corporation of Wisconsin
Filed Oct. 11, 1967, Ser. No. 674,475
Int. Cl. H02p 1/44
U.S. Cl. 318—221                            7 Claims

ABSTRACT OF THE DISCLOSURE

In a capacitor-start motor, the starting condenser is connected in series with the main winding during starting, while the auxiliary winding is connected directly across the A.C. line. Preferably a running condenser is also connected directly across the line for starting. At switchover the starting capacitor is disconnected and the circuit becomes conventional, with the running capacitor in series with the auxiliary winding.

---

This invention relates to capacitor-start motors adapted to be energized with single-phase alternating current, and pertains more especially to starting circuits for so-called soft start motors, that is, motors which draw a relatively low starting current.

The capacitor-start type of motor to which this invention relates has a squirrel cage rotor and has on its stator a main winding that defines one set of circumferentially spaced poles and an auxiliary winding that defines a second set of poles which are between the poles of the main winding. In the heretofore conventional starting circuit for such a motor, the auxiliary winding was connected across the power source in series with a capacitor, and the main winding was connected directly across the power source. Because of the capacity in series with the auxiliary winding, current in its poles led the applied voltage, while current in the poles defined by the main winding lagged the applied voltage. Hence the polarity of each main winding pole changed in lagging relation to the polarity of its adjacent auxiliary winding poles, with the result that there was a revolving magnetic field in the motor air gap which produced torque at zero rotor speed.

When the motor reached a predetermined speed—usually about 70% to 80% of its running speed for a conventional motor—speed responsive switch means effected certain reconnections or disconnections to establish a running circuit. The nature of the running circuit depended upon whether the machine was an induction-run motor or a capacitor-run motor.

In the case of a capacitor-start induction-run motor, the auxiliary winding and the capacitor were cut out of the circuit as the motor came up to speed, and the motor ran with only its main winding energized.

In the case of a capacitor-start capacitor-run motor, the capacitor comprised a pair of condensers that were connected in parallel with one another during starting to provide a large capacity that gave high starting torque per ampere of starting current. But the capacity of the parallel connected condensers was excessive at running speed, owing to the fact that the reactance of a condenser in a motor circuit remains substantially constant at all motor speeds while the impedance of the windings increases as the motor accelerates. Therefore, to avoid unbalance at running speed, caused by one of the windings tending to induce a substantially stronger magnetic field than the other, and resulting in noise and overheating, one of the condensers was cut out of the circuit by the speed responsive switch means as the motor came up to near its running speed, leaving the other condenser still in series circuit with the auxiliary winding.

Heretofore capacitor-start induction-run motors, and most capacitor-start capacitor-run motors, drew a current at starting that was several times the current that they drew when running. Hence, unless such a motor was connected to a power circuit of substantially high current capacity, it tended to cause a temporary voltage drop in the power circuit every time it started, causing an annoying flickering of the lights connected with that circuit.

In an effort to avoid such voltage dip, some capacitor-start motors have been provided with a pair of main windings that were connected in series for starting and reconnected in parallel for running. A motor with such reconnectable main windings was a soft start motor in the sense that it drew a starting current that was not much greater than its full load current; but the use of reconnectable main windings did not afford complete assurance against voltage dips because with such a motor there was an abrupt four-to-one drop in main winding impedance at switchover. Such a motor had the disadvantage of tending to accelerate slowly under fan-type load because its torque did not increase very much with increasing speed.

With the foregoing observations in mind, it is the general object of this invention to provide a capacitor-start motor having a speed torque curve which closely matches the fan load curve and which is therefore well adapted for fan-type loads, but which draws a substantially lower starting current than a heretofore conventional capacitor-start motor of equivalent horsepower and having a speed torque curve suitable for such loads.

Another object of this invention is to provide a capacitor-start circuit for single-phase A.C. motors intended for fan-type loads that makes feasible the use of relatively high horsepower motors on single-phase A.C. power supply lines without likelihood of producing objectionable voltage drops on such lines whenever the motor starts.

Another object of this invention is to provide a single-phase A.C. capacitor-start motor that has substantially better torque characteristics when operating in its starting mode than those heretofore conventional capacitor-start motors which had two main windings that were reconnectable in series and in parallel circuits.

A specific object of this invention is to provide a capacitor-start capacitor-run motor that has an auxiliary winding and a pair of main windings which are reconnected from series connection for starting to parallel connection for running as the motor approaches its running speed, but wherein no substantially large change in reactance occurs at switchover and which is its starting mode has a speed-torque curve that more nearly matches the fan load curve than heretofore conventional capacitor-start motors with reconnectable main windings.

Another specific object of this invention is to provide a capacitor-start motor having a main winding and an auxiliary winding that is connected in parallel with the main winding for starting, but which motor, at starting, draws not more than about 200% to 300% of its full load current and does not need a particularly high capacity nor high voltage starting condenser.

With these observations and object in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiment of the invention constructed according to the best modes so far devised for the practical application of the principles thereof, and in which:

FIGURE 1 is a circuit diagram of a single-phase A.C.

motor embodying the principles of this invention, shown in its condition for starting;

FIGURE 2 is a schematic diagram of the motor of FIGURE 1, shown in its running condition; and FIGURE 3 is a circuit diagram of a motor having a pair of reconnectable main windings and embodying the invention, shown in its starting condition.

Referring now to the accompanying drawings, the motor 5 of this invention, which is adapted to be connected to the mains $L_1$ and $L_2$ of a single-phase A.C. supply, has a conventional squirrel-cage rotor 6, a main winding 7 that is distributed around a stator to provide an even number of poles P-1 through P-4, and an auxiliary winding 8 that is wound on the stator between the poles of the main winding to provide a like number of poles P-1' through P-4'. For purposes of illustration the motor shown in FIGURE 2 has four poles, but it will be understood that the invention is applicable to a motor having any number of poles.

When the motor is running at normal speed, a running condenser 9 is connected in series with the auxiliary winding 8, as illustrated in FIGURE 2, and the running circuit is that which is conventional for a capacitor-run motor. Because of the capacity in series with the auxiliary winding, current in the auxiliary winding leads that in the main winding. As each pole undergoes an alteration in polarity during each cycle of the impressed voltage, the change in polarity of each auxiliary winding pole leads that of the main winding poles adjacent to it and the stator produces a rotation magnetic field. Torque that tends to keep the rotor turning is produced as the result of induction in it of another magnetic field.

The motor 5 of this invention differs from a heretofore conventional capacitor-start capacitor-run motor with respect to its starting circuit. In the starting mode, illusrated in FIGURE 1, the main winding 7 is connected across the mains $L_1$ and $L_2$ in series with a starting condenser 10, the auxiliary winding 8 is connected directly across the mains so as to be in parallel with the series-connected main winding and starting capacitor, and the running capacitor 9 is likewise connected directly across the mains.

To provide for reconnection from the starting mode to the running mode, the motor has speed responsive switch means which can be a centrifugally actuated switch or a relay and which comprises three ganged double-throw switch elements $SW_1$, $SW_2$ and $SW_3$. Switchover occurs at about 90% to 95% of the running speed of the motor.

Switch elements $SW_1$ and $SW_3$ cooperate to connect the starting capacitor 10 in series with the main winding for starting and to disconnect the starting capacitor from the circuit when the motor comes up to speed. To this end of the contactors of both switch elements $SW_1$ and $SW_3$ are connected with one of the mains $L_2$, one side of the main winding 7 is connected with the other main $L_1$ by means of a conductor 12, the other side of the main winding is connected with one terminal of the starting capacitor 10 by means of a conductor 13, and the other terminal of the starting capacitor is connected with "start" terminal $S_1$ of switch element $SW_1$ by means of a conductor 14. The "run" terminal $R_1$ of switch element $SW_1$ is blank.

Switch elements $SW_2$ and $SW_3$ cooperate to connect the auxiliary winding 8 and the running capacitor 9, in parallel, directly across mains $L_1$ and $L_2$ during starting, and to connect them in series with one another for running. To this end switch element $SW_2$ has its "start" terminal $S_2$ connected with main $L_1$ and has its "run" terminal $R_2$ connected with main $L_2$ by means of a conductor 15, while its contactor is connected with one end of auxiliary winding 8. The other end of the auxiliary winding is connected with the "start" terminal $S_3$ of switch element $SW_3$ by means of a conductor 16. Thus during starting the auxiliary winding is connected directly with main $L_1$ by means of switch element $SW_2$ and directly with main $L_2$ by means of conductor 16 and switch element $SW_3$. The starting capacitor 9 has one terminal connected directly with main $L_1$ by means of a conductor 17 and has its other terminal connected by means of a conductor 18 with "start" terminal $S_3$ of switch element $SW_3$, in common with conductor 16.

When the motor comes up to switchover speed, at about 90% to 95% of its normal running speed, the starting condenser 10 is cut out of the circuit because the contactor of switch element $SW_1$ engages its blank "run" terminal $R_1$, and the main winding 7 is connected directly across the mains by means of a jumper 19 that connects conductor 13 with the now-engaged "run" terminal $R_3$ of switch element $SW_3$. At the same time the running condenser 9 is connected in series with the auxiliary winding, and the latter is reversedly reconnected with the mains, as can be traced from conductor 17, which connects the running condenser with main $L_1$, series-connected conductors 18 and 16 which connect that condenser with one side of the auxiliary winding, and switch element $SW_2$ which has its contactor connected with the other side of the auxiliary winding and has its "run" terminal $R_2$ connected with main $L_2$ by means of the conductor 15.

When the motor of this invention is operating in its starting mode, its main winding 7 performs more or less the same function as the auxiliary winding in a heretofore conventional capacitor start motor, in that the main winding is connected in series with the starting capacitor 10 and the current in it leads that in the other winding.

However, the locked-rotor amperage of a motor, incoporating the starting circuit of FIGURES 1 and 2, is about half that of a motor of equivalent horsepower having a heretofore conventional capacitor-start circuit; and while its locked rotor torque is likewise about 50% of that of such a prior motor, this lock-rotor torque is quite adequate for a fan-type load wherein torque increases with horsepower, especially since the breakdown torque of the FIGURES 1 and 2 motor in its starting mode is about 75% of that of the equivalent prior motor. In its running mode the torque characteristics of the motor illustrated in FIGURES 1 and 2 are of course identical with those of its prior art equivalent, as might be expected from the conventional nature of its running circuit.

Thus the starting characteristics of the motor shown in FIGURES 1 and 2 are at least as well suited to fan-type loads as those of prior capacitor-start motors of equivalent horsepower, but its maximum current draw is substantially lower.

Locked rotor current drawn by the motor having the starting circuit of FIGURES 1 and 2 can be controlled to some extent by design of the auxiliary winding. Normally the auxiliary winding in such a motor will be designed to draw in the neighborhood of 40% to 50% more current than is drawn by the main winding in series with the starting condenser.

Under some circumstances it might not be necessary to reverse the connections of the auxiliary winding with the mains at switchover. However, in most cases it will be found desirable to do so, inasmuch as the connection of the running capacitor 9 in series with the auxiliary winding and the disconnection of the starting capacitor 10 from series circuit with the main winding brings about a relationship of the current phases in the windings such that the auxiliary winding and its capacitor create a braking effect if the auxiliary winding is not reversedly reconnected, and this lowers the running efficiency of the motor to some extent and could cause excessive heating.

Of course the capacitor-start circuit illustrated in FIGURE 1 is applicable to an induction-run motor, from which the running capacitor 9 would be omitted and in which the auxiliary winding 8 as well as the starting capacitor 10 would be disconnected from the circuit at switchover, so that the motor ran only on its main winding.

For that matter, the running capacitor 10 need not be in the circuit when the motor is operating in its starting mode. However, to take it out of the circuit during starting would require at least one additional contact element in the speed responsive switch means, and the connection of the running capacitor in the starting circuit is by no means undesirable because it provides some power factor correction.

FIGURE 3 illustrates the invention applied to a motor having a pair of main windings 107 and 207 which are connected in series with a starting capacitor 10 when the motor is operating in its starting mode and which are reconnected in parallel with one another, directly across the mains $L_1$ and $L_2$, for running operation. Again in this case, during starting an auxiliary winding 8 and a running capacitor 9 are connected across the mains $L_1$ and $L_2$ in parallel with one another and with the series-connected main windings and starting capacitor; and during running the auxiliary winding 8 is reversedly reconnected in series with the running capacitor 9.

Reconnections are provided for by means of speed responsive switch means comprising three ganged switch elements designated $SW_4$, $SW_5$ and $SW_6$. Switch element $SW_4$ provides for reconnection of the main windings 107 and 207 from series for starting to parallel for running and has its contactor connected with one end of main winding 207. The other end of main winding 207 is connected with main $L_2$. One end of main winding 107 is connected with main $L_1$ and its other end is connected with a terminal of starting capacitor 10 by means of a conductor 22. The other terminal of that capacitor is connected by means of a conductor 23 with the "start" terminal $S_4$ of switch element $SW_4$. Hence when the motor is operating in its starting mode, a series circuit can be traced from main $L_1$ through main winding 107, conductor 22, starting condenser 10, conductor 23, switch element $SW_4$ and main winding 207 to main $L_2$.

Switch element $SW_6$, which has its contactor connected with main $L_2$, cooperates with switch element $SW_4$ to connect the main windings in parallel across the supply mains for motor running. Switch element $SW_6$ also cooperates with switch element $SW_5$ to connect the auxiliary winding and the running capacitor in parallel across the mains during starting and to reversedly connect the auxiliary winding across the mains in series with the running capacitor during running.

Switch element $SW_5$ has its "start" terminal $S_5$ connected with main $L_1$ by means of a conductor 25, and has its "run" terminal $R_5$ connected with main $L_2$, while its contactor is connected with one end of the auxiliary winding. The other end of the auxiliary winding is connected with the "start" terminal $S_6$ of switch element $SW_6$ by means of a conductor 26. Hence when switch elements $SW_5$ and $SW_6$ are in their starting conditions they connect the auxiliary winding directly across the power mains and in parallel with the circuit comprising the main windings in series with the starting capacitor.

One terminal of running capacitor 9 is directly connected with main $L_1$, and its other terminal is connected to the "start" terminal $S_6$ of switch element $SW_6$ by means of a conductor 27, so that said capacitor is in parallel with the auxiliary winding during starting.

The "run" terminal $R_4$ of switch element $SW_4$ is connected with main $L_1$ by means of a conductor 28, and the "run" terminal $R_6$ of switch element $SW_6$ is connected with conductor 22 by means of a jumper 29. Hence when switch elements $SW_4$ and $SW_6$ are in their running positions one end of main winding 107 remains connected with main $L_1$, while its other end is connected with main $L_2$ by means of series connected conductors 22 and 29 and switch element $SW_6$; and one end of main winding 207 remains connected with main $L_2$ while its other end is connected with main $L_1$ by means of switch element $SW_4$ and conductor 28. The starting capacitor 10 is then out of the circuit.

To provide for reversed reconnection of the auxiliary winding 8 in series with the running capacitor 9, the "run" terminal $R_5$ of switch element $SW_5$ is connected with main $L_2$, and the series circuit can be traced from switch element $SW_5$ to one side of the auxiliary winding, thence from the other side of the auxiliary winding through connected conductors 26 and 27 to one terminal of the running capacitor 9, and from its other terminal of that capacitor by way of conductor 24 to main $L_1$.

Again, the running capacitor 9 could be cut out of the circuit during starting, but the additional switch gear necessary for doing so would not be warranted, especially since that capacitor provides some power factor correction when in the starting circuit. As with the motor of FIGURES 1 and 2, the starting current (and starting torque) of the FIGURE 3 motor can be controlled to some extent by the design of the auxiliary winding.

As compared with an equivalent horsepower heretofore conventional capacitor-start capacitor-run motor having a pair of main windings that are connected in series for starting and reconnected in parallel for running, the motor illustrated in FIGURE 3 draws somewhat higher starting current, in that its locked rotor amperage is about 200% to 300% of its full load amperage as compared with about 100%; but its locked rotor torque is substantially higher, so that it accelerates faster, and it does not draw an abruptly increased current at switchover. Furthermore, the heretofore conventional motor of this type had very nearly constant torque from locked rotor to switchover (its locked rotor torque was about 90% of its torque at the speed just below switchover), whereas the motor of FIGURE 3 has a breakdown torque in the starting mode of approximately 130% of its full load torque, so that its curve of torque v. r.p.m. is better suited to a fan-type load. As compared with an equivalent horsepower heretofore conventional capacitor-start motor having a single main winding, the motor of FIGURE 3 draws substantially lower starting current.

While the motor of FIGURE 3 has more winding connections than the motor of FIGURES 1 and 2, the cost of these is offset to some extent by the fact that it can use a starting condenser of lower capacity.

From the foregoing description taken with the accompanying drawings it will be apparent that this invention provides a capacitor-start motor that is especially well adapted for driving a fan-type load where relatively high horsepower must be obtained from a single-phase AC circuit without causing objectionable voltage dips in the circuit whenever the motor starts.

What is claimed as my invention is:

1. An electric motor adapted to be energized from a single-phase alternating current source and having a main winding, an auxiliary winding, capacitor means and speed responsive switch means operative when the speed of the motor is above a predetermined value to complete a running circuit comprising the main winding and operative when the speed of the motor is below said value to complete a starting circuit comprising both of said windings and the capacitor means, said motor being characterized by:
   (A) the starting circuit comprising
      (1) the capacitor means connected in series with the main winding, and
      (2) the auxiliary winding connected in parallel with the series-connected main winding and capacitor means; and
   (B) the starting circuit further comprising second capacitor means connected in parallel with the auxiliary winding.

2. The electric motor of claim 1, further characterized by:
   the running circuit further comprising
      (1) the auxiliary winding and the second capacitor means connected in series with one another, and
(2) the main winding connected in parallel with the series-connected auxiliary winding and second capacitor means.

3. The electric motor of claim 2, further characterized by:
(A) the starting circuit further comprising a second main winding connected in series with the first designated main winding and the first designated capacitor means; and
(B) the running circuit further comprising said second main winding connected in parallel with the first designated main winding.

4. The electric motor of claim 2, further characterized by:
the auxiliary winding being reversedly connected in the running circuit relative to its connections in the starting circuit.

5. In an electric motor having a main winding, an auxiliary winding, starting capacitor means, running capacitor means, and speed responsive switch means for connecting said windings and capacitor means with a pair of supply mains comprising a single phase alternating current source:
(A) starting circuit means rendered operative by the switch means at speeds below a predetermined value comprising
(1) means connecting the main winding and starting capacitor means in series with one another across the supply mains,
(2) means connecting the auxiliary winding in parallel with the series-connected main winding and starting capacitor means, with one end of the auxiliary winding connected with one of the supply mains and the other end of the auxiliary winding connected with the other supply main, and
(3) means connecting the running capacitor means across the supply mains in parallel with the auxiliary winding; and
(B) running circuit means rendered operative by the switch means at motor speeds above said predetermined value comprising
(1) means connecting the auxiliary winding in series with the running capacitor means, with the auxiliary winding reversedly connected relative connections in the starting circuit, said means providing
(a) a connection between the first designated end of the auxiliary winding and the running capacitor means,
(b) a connection between the other end of the auxiliary winding and the first designated supply main, and
(c) a connection between the running capacitor means and said other supply main; and
(2) means connecting the main winding across the supply mains in parallel with the series-connected auxiliary winding and running capacitor means.

6. A capacitor-start motor adapted to be energized from a pair of supply mains that provide a single phase alternating current source and which motor has a main winding that is connected substantially directly across the supply mains when the motor runs, an auxiliary winding that cooperates with the main winding to produce a rotating magnetic field, capacitor means for connection in the motor circuit during motor starting to cause a phase difference between the currents in the main and auxiliary windings, and switch means responsive to a function of motor speed to effect connection of the capacitor means in the motor circuit during motor starting, said motor being characterized by:
(A) second capacitor means;
(B) said switch means being so arranged that
(1) during sarting
(a) the first mentioned capacitor means is conected in series with the main winding, and
(b) the auxiliary winding is connected in parallel with the series - connected main winding and first capacitor means, and
(2) during running the second capacitor means is connected in series with the auxiliary winding.

7. The motor of claim 6, further characterized by: said switch means being further so arranged that during starting the second capacitor means is connected in parallel with the auxiliary winding.

References Cited

UNITED STATES PATENTS

| 2,280,971 | 4/1942 | Packer | 318—225 XR |
| 3,260,910 | 7/1966 | Spindler | 318—225 |

FOREIGN PATENTS

| 739,350 | 1/1933 | France. |

ORIS L. RADER, Primary Examiner

GENE RUBINSON, Assistant Examiner

U.S. Cl. X.R.
318—225

PO-1050
(5/69)

UNITED STATES PATENT OFFICE
CERTIFICATE OF CORRECTION

Patent No. 3,484,670            Dated December 16, 1969

Inventor(s) H.J. Shankwitz

It is certified that error appears in the above-identified patent and that said Letters Patent are hereby corrected as shown below:

Column 2, line 49, "is" should read -- in --. Column 3, line 30, "rotation" should read -- rotating -- . Column 4, line 32-3, "incorporating" is misspelled. Claim 5, B (1), Column 7, line 48, "to its" should precede the word -- connections --, making the sentence read: -- to its connections in the starting circuit, said means -- .

SIGNED AND
SEALED
APR 28 1970

(SEAL)
Attest:

Edward M. Fletcher, Jr.
Attesting Officer

WILLIAM E. SCHUYLER, JR.
Commissioner of Patents